US012710597B2

(12) United States Patent
Zhao et al.

(10) Patent No.: US 12,710,597 B2
(45) **Date of Patent: *Aug. 18, 2026**

(54) PHOTOELECTRIC HYBRID CONNECTOR AND PHOTOELECTRIC HYBRID ADAPTER

(71) Applicant: ACCELINK TECHNOLOGIES CO., LTD, Wuhan (CN)

(72) Inventors: Xiaobo Zhao, Wuhan (CN); Xinhai Zhu, Wuhan (CN); Mengyang Song, Wuhan (CN); Bengqing Quan, Wuhan (CN); Yong Luo, Wuhan (CN); Yu Li, Wuhan (CN)

( * ) Notice: Subject to any disclaimer, the term of this patent is extended or adjusted under 35 U.S.C. 154(b) by 416 days.

This patent is subject to a terminal disclaimer.

(21) Appl. No.: 18/273,196

(22) PCT Filed: Apr. 14, 2021

(86) PCT No.: PCT/CN2021/087313

§ 371 (c)(1),
(2) Date: Jul. 19, 2023

(87) PCT Pub. No.: WO2022/156077

PCT Pub. Date: Jul. 28, 2022

(65) Prior Publication Data

US 2024/0201446 A1 Jun. 20, 2024

(30) Foreign Application Priority Data

Jan. 19, 2021 (CN) ......................... 202110068334.2

(51) Int. Cl.
*G02B 6/38* (2006.01)
*H01R 13/04* (2006.01)
(Continued)

(52) U.S. Cl.
CPC ......... *G02B 6/3817* (2013.01); *G02B 6/3825* (2013.01); *H01R 13/04* (2013.01);
(Continued)

(58) Field of Classification Search
CPC ...... G02B 6/38; G02B 6/3817; G02B 6/3825; H01R 13/04; H01R 13/40; H01R 13/502; H01R 13/6272
See application file for complete search history.

(56) References Cited

U.S. PATENT DOCUMENTS 10,768,374 B2 * 9/2020 Gurreri ................ G02B 6/3869
2002/0102066 A1 * 8/2002 Nishita ................ G02B 6/4277 385/60

(Continued)

FOREIGN PATENT DOCUMENTS

CN 202256774 U 5/2012
CN 104730649 A 6/2015

(Continued)

*Primary Examiner* — Tina Wong
(74) *Attorney, Agent, or Firm* — EDGETECH LAW LLP

(57) ABSTRACT

A photoelectric hybrid connector and a photoelectric hybrid adapter. The photoelectric hybrid connector comprises: a housing assembly having a front-to-back through accommodating space; a light guide assembly having a tail handle, a plug core, and an optical fiber, wherein the plug core is positioned at one end of the tail handle, the tail handle is positioned in the accommodating space, and the optical fiber sequentially penetrates the tail handle and the plug core; and a conductive assembly having at least one conductive pin and a cable connected to the conductive pin, wherein the conductive pin and the plug core are located on the same side of the accommodating space. The conductive pin and the plug core share one insertion part on the same side, and a photoelectric channel can be established by one insertion, thereby simplifying the insertion operation of the photoelectric hybrid connector.

12 Claims, 9 Drawing Sheets

(51) Int. Cl.
*H01R 13/40* (2006.01)
*H01R 13/502* (2006.01)
*H01R 13/627* (2006.01)

(52) U.S. Cl.
CPC ........... *H01R 13/40* (2013.01); *H01R 13/502* (2013.01); *H01R 13/6272* (2013.01)

(56) References Cited

U.S. PATENT DOCUMENTS

| | | | | |
|---|---|---|---|---|
| 2013/0089290 | A1* | 4/2013 | Sloey | G02B 6/3817 385/74 |
| 2015/0011044 | A1 | 1/2015 | Choi et al. | |
| 2017/0307828 | A1 | 10/2017 | Elenbaas | |
| 2017/0315301 | A1 | 11/2017 | Kelly | |
| 2018/0031775 | A1 | 2/2018 | Gurreri et al. | |
| 2020/0264382 | A1 | 8/2020 | Bretz et al. | |
| 2022/0031738 | A1 | 2/2022 | Beal et al. | |
| 2022/0155529 | A1* | 5/2022 | Liu | G02B 6/3825 |
| 2022/0390695 | A1* | 12/2022 | Tsuda | H01R 13/46 |
| 2024/0077683 | A1* | 3/2024 | Zhao | G02B 6/3877 |

FOREIGN PATENT DOCUMENTS

| | | | |
|---|---|---|---|
| CN | 111025490 | A | 4/2020 |
| CN | 111106469 | A | 5/2020 |

* cited by examiner

PHOTOELECTRIC HYBRID CONNECTOR AND PHOTOELECTRIC HYBRID ADAPTER

CROSS-REFERENCE

The present disclosure claims a benefit of, and priority to Chinese Patent Disclosure No. 202110068334.2 filed on Jan. 19, 2021, the disclosure of which is hereby expressly incorporated by reference herein in its entirety.

TECHNICAL FIELD OF THE DISCLOSURE

This application relates to the field of optical communication technology, and in particular to a photoelectric hybrid connector and a photoelectric hybrid adapter

BACKGROUND

An optical fiber communication is a communication method that uses light waves as the information carrier and optical fibers as the transmission medium. In the field of optical communication technology, it usually involves connectors, optical modules, adapters and other devices.

A connector is an optical passive device that realizes the connection between optical fibers. It has a function of live connection between optical fibers and optical fibers, between optical fibers and active devices, between optical fibers and other passive devices, and optical fibers and instruments. As a very important optical signal interface device in optical fiber communication, an optical module has an optical interface and an electrical interface, where the optical interface is connected with optical fibers to transmit optical signals, and the electrical interface is connected with an external communication terminal device. The adapter is used to connect two connectors and the conversion therebetween.

In prior technologies, devices represented by 5G base stations have a large number of plug-in photoelectric lines. A large number of connectors that may be divided into two categories, that is, optical devices and electrical devices, which shall be paired correctly with each other, are required due to the separate settings of optical devices and electrical devices, leading to a high possibility of cumbersome operation during installation and maintenance, and being prone to incorrect insertion.

SUMMARY

In view of this, embodiments of the present application aim to provide a photoelectric hybrid connector and a photoelectric hybrid adapter to solve the problem in respective of cumbersome operation.

In order to achieve the above purpose, the technical solution of the present application embodiment is achieved as follows.

A photoelectric hybrid connector, comprising: a housing assembly having a front-to-rear through accommodating space: a light guide assembly having a tail handle, a plug core, and an optical fiber, wherein the plug core is arranged on one end of the tail handle, the tail handle is arranged in the accommodating space, and the optical fiber sequentially passes through the tail handle and the plug core: and a conductive assembly having at least one conductive pin and a cable connected to the conductive pin, wherein the conductive pin and the plug core are located on the same side of the accommodating space.

Furthermore, the conductive pin extends at least partially out of the accommodating space.

Furthermore, the conductive pin is arranged on an outer side of the housing assembly.

Furthermore, the housing assembly comprises an outer housing, a rear sleeve, and a tail sleeve, wherein the outer housing is nested with the rear sleeve to form the front-to-rear through accommodating space, and the tail sleeve is nested at one end of the rear sleeve far from the outer housing: and the conductive pin is arranged on the outer side of the outer housing.

Furthermore, the outer housing comprises a housing body with a first through hole, and the conductive pin is arranged on an outer side surface of the housing body: the rear sleeve is a sleeve with a second through hole; the housing body is nested with the rear sleeve, and the first through hole is penetrated through by the second through hole to form the accommodating space: the tail sleeve is a sleeve with a third through hole, and a side wall of the tail sleeve is arranged with a second channel: one end of the cable passes through the third through hole from a side of the tail sleeve far away from the rear sleeve, and then passes through the second channel to reach an outer side of the tail sleeve to connect with the conductive pin.

Furthermore, the conductive assembly comprises a fixed seat arranged on a side wall of the housing body, wherein the fixed seat is provided with a second through hole, into which one end of the conductive pin is inserted.

Furthermore, the outer housing comprises an elastic buckle plate arranged on the side wall of the housing body, which is provided with a third channel for the cable to pass through.

Furthermore, the housing assembly comprises an elastic member arranged in the accommodating space, with one end of the elastic member abutting against the rear sleeve and the other end abutting against the tail handle.

Furthermore, a number of conductive pins is two.

Furthermore, the conductive pin comprises a needle tube, a needle head inserted into the needle tube, and an elastic member arranged within the needle tube, wherein the conductive pin is configured so that the end face of the needle head is retractable relative to the housing assembly.

A photoelectric hybrid adapter, which is matched with the photoelectric hybrid connector mentioned above. The photoelectric hybrid adapter comprises a body, a support part, a sleeve member, and a conductive part, wherein the body is provided with at least one channel axially penetrating therethrough: the support part is supported within the channel and separates the channel into two sub-channels, which are respectively inserted and matched with the housing assemblies of the corresponding photoelectric hybrid connector; the sleeve member is hollow and arranged along an axial direction of the channel, and the sleeve member is arranged on the support part with two sub-channels penetrating therethrough: the two ends of the sleeve member are respectively connected and matched with the corresponding plug core of the photoelectric hybrid connector: the conductive part is arranged on the support part, and the conductive part is configured such that the conductive pins of two photoelectric hybrid connectors are electrically connected.

Furthermore, the conductive part is an axial through-hole, and both ends of the conductive part are configured to provide for insertion of the conductive pins of two photoelectric hybrid connectors to achieve electrical connection.

Furthermore, the conductive part comprises a guide hole axially penetrating therethrough and a conductive body arranged in the guide hole, with both sides of the conductive body electrically connected to the conductive pins of two photoelectric hybrid connectors.

Furthermore, the conductive body is a sleeve with an open end, and an open end of the conductive body is inserted by the conductive pin of one photoelectric hybrid connector, and a closed end of the conductive body abuts against the conductive pin of another photoelectric hybrid connector.

Furthermore, two ends of the conductive body abut against the conductive pin of each photoelectric hybrid connector, respectively.

A photoelectric hybrid connector and photoelectric hybrid adapter according to the embodiment of the present application are provided with a housing assembly, a light guide assembly, and an electricity conductive assembly: the light guide assembly comprises a plug core, and the electricity conductive assembly comprises at least one conductive pin and a cable connected to the conductive pin; and the conductive pin and the plug core are located on the same side of the accommodating space, so that the conductive pin and the plug core share a common insertion component on the same side, and the photoelectric channel can be established by mere one insertion, thereby simplifying the insertion operation and avoiding incorrect operations that may cause the photoelectric channel to be unsmooth, effectively realizing the transmission of photoelectricity

DETAILED DESCRIPTION

It should be noted that, as long as no conflicts occur, the technical features in the embodiments and the embodiments of this application can be combined with each other. The detailed description in the specific embodiments should be understood as an explanatory note of this application and should not be explained as an improper limitation of this application.

Figure 1:
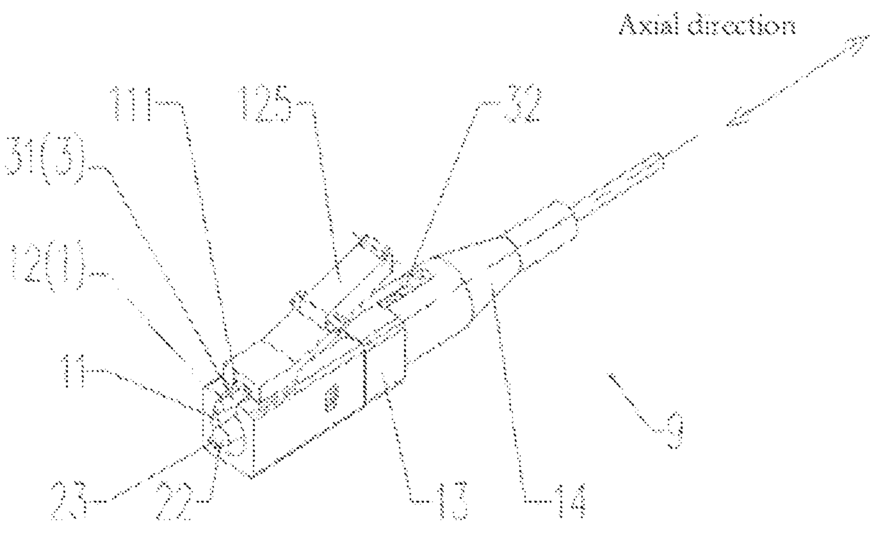
FIG. 1 is a three-dimensional view of a photoelectric hybrid connector according to an embodiment of the present application.
Figure 2:
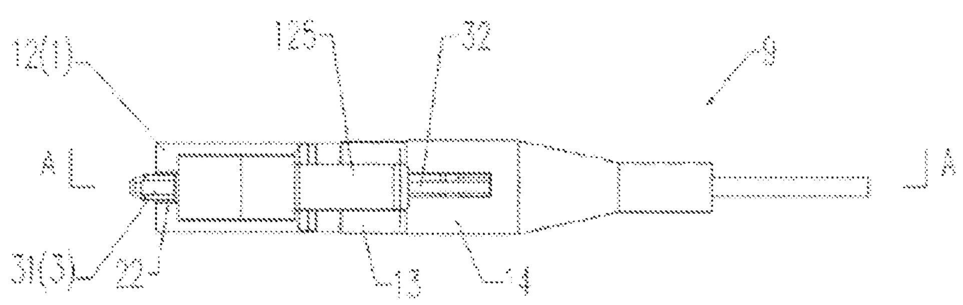
FIG. 2 is a top view of FIG. 1.
Figure 3:
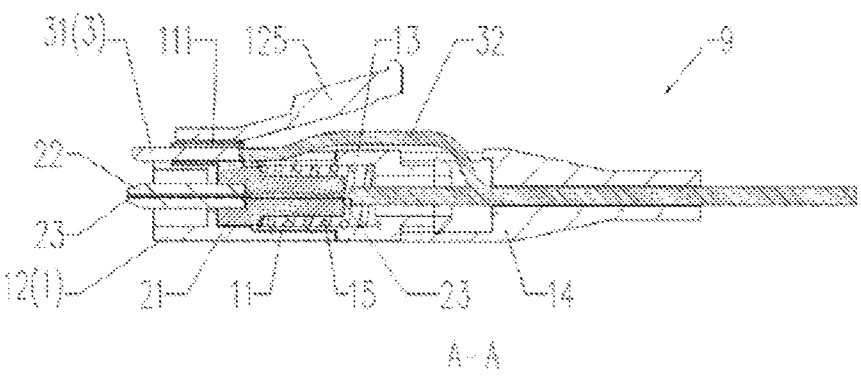
FIG. 3 shows an A-A cross-sectional view of FIG. 2.
Figure 4:
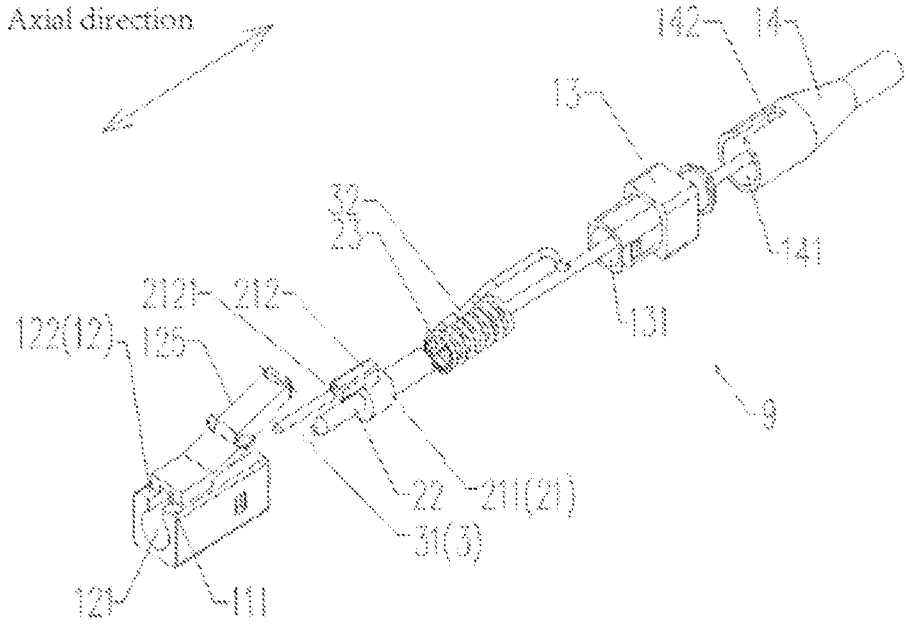
FIG. 4 is an exploded view of the photoelectric hybrid connector in FIG. 1 from a viewing angle.
Figure 5:
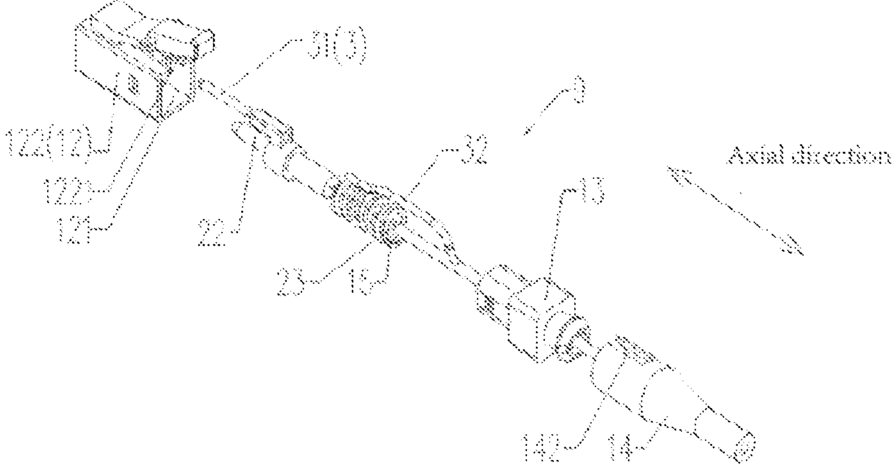
FIG. 5 is an exploded view of the photoelectric hybrid connector in FIG. 1 from another viewing angle.

In the description of the embodiments of the present application, the orientations or position relationships such as "up", "down", "left", "right", "front", "rear" are based on the orientations or position relationships shown in FIG. 1, where the "front" refers to the direction approaching the plug core 23 along the axial direction, and the "rear" refers to the direction running away from the plug core 23 along the axial direction. It should be understood that these orientation terms are only put forward for the convenience of describing the present application and simplifying the description, rather than indicating or implying that the devices or components referred to must have a specific orientation, be constructed and operated in a specific orientation, therefore they cannot be understood as a limitation to this application.

As shown in FIGS. 1 to 21, provided is a photoelectric hybrid connector comprising a housing assembly 1, a light guide assembly 2, and a conductive assembly 3.

The housing assembly 1 comprises a front-to-rear through accommodating space 11, which is used to hold other components, and an outer side of the housing assembly 1 can plug fit with the optical module, photoelectric hybrid adapter, etc.

The light guide assembly 2 comprises a tail handle 21, a plug core 22, and an optical fiber 23. Among them, optical fiber 23 comprises a plastic outer layer (not indicated), a cladding (not indicated), and a fiber core arranged within the cladding. The fiber core can be a glass fiber core for transmitting light signals, while the plastic outer layer is used to provide protection.

The plug core 22 is arranged on one end of the tail handle 21: the optical fiber 23 is sequentially inserted into the tail handle 21 and the plug core 22 until the fiber core is flush with the end of the plug core 22 distant from the tail handle 21. The optical signal is transmitted in the fiber core until it reaches one end face of the plug core 22, and then transmitted through components that are coupled and docked with the plug core 22, thereby achieving the transmission of the optical signals. The components here can be either the plug core 22 of another photoelectric hybrid connector, or an optical socket of the optical module. Corresponding grooves and blocks can be arranged in the accommodating space 11 to cooperate with the tail handle 21 to achieve axial limit, so that the tail handle 21 is arranged in the accommodating space 11.

The conductive assembly 3 comprises at least one conductive pin 31 and a cable 32 connected to the conductive pin 31. The conductive pin 31 and the plug core 22 are located on the same side of the accommodating space 11, so that the conductive pin 31 and the plug core 22 core share a common insertion component on the same side, thus the photoelectric channel can be established by only one insertion, which can simplify the insertion operation and avoid misoperation causing the photoelectric channel to be unsmooth, effectively achieving the transmission of photoelectricity. According to the needs of structural functions, the number of conductive pins 31 can be one, two, or three or more.

In various embodiments of the present application, the conductive pin 31 and the cable 32 can be directly connected to form an electrical transmission channel: the conductive pin 31 and cable 32 can also be connected through a section of metal cylinder, which serves as a transitional connection part to prevent the failure of the connection between the conductive pin 31 and cable 32.

The conductive pin 31 can partially extend out from the accommodating space 11. Specifically, as shown in FIGS. 1 to 5, one end of the conductive pin 31 connected to the cable 32 is fixed in the accommodating space 11, and the end of the conductive pin 31 that is distant from the cable 32 extends axially until it protrudes into the accommodating space 11 to facilitate the transmission of electricity to the electrically coupled components. As shown in FIGS. 6 to 11, the conductive pin 31 can also be fixed on the outer side of the housing assembly 1, so that the conductive pin 31 is entirely outside the accommodating space 11. The end of the conductive pin 31 distant from the cable 32 extends axially forward until it crosses the front end of the housing assembly 1 to form a protrusion, which completes the transmission of electricity with the electrically coupled components. The components here can be either the conductive pin 31 of another photoelectric hybrid connector, the electrical socket of the optical module, or an electrical connector on the 5G terminal device.

The conductive pin 31 and cable 32 form an electrical transmission channel to achieve electrical transmission. The electricity here can be electrical energy supplied to terminal devices or electrical signals with customer business data.

Taking the transmission of electrical signals as an example, in prior technologies, the optical communication equipment comprises one or more types of single boards to complete functions such as processing, transmission, and exchange of customer business data. The optical module is one of the important assemblies of the optical communication equipment, which is used to carry the customer service data in the optical signal for transmission and/or analyze the customer service data from the optical signal. Correspondingly, the optical module has an optical socket and an electrical socket to receive/transmit optical signals and electrical signals respectively. In the embodiments of the application, the conductive contact pin 31 is electrically connected with the electrical socket 43 (mentioned below) of the optical module to establish a channel for transmitting electrical signals. The optical socket 42 (mentioned below) of the optical module is optically coupled with the optical fiber 23 in the plug core 22 of the light guide assembly 2 to establish a channel for transmitting optical signals. The optical signal sent from the outside enters the optical socket 42 of the optical module through the optical fiber 23. The optical module processes the optical signal and converts it into an electrical signal, which is transmitted to the terminal device through the electrical socket 43. It is also possible to implement the process in reverse: that is, the electrical signal sent by the terminal device is transmitted to the electrical socket 43 of the optical module through the conductive pin 31, and the optical module processes the electrical signal and converts it into an optical signal, which is transmitted to the optical fiber 23 in the plug core 22 of the light guide assembly 2 through the optical socket 42, and then transmitted to the terminal device at the other end. Thus the processes of receiving, converting, and transmitting optical and electrical signals are completed.

Taking the power supply to terminal devices as an example, in prior technologies, the operation of optical communication equipment itself requires power supply, and especially in 5G applications, there are many corresponding optical connectors and electrical connectors for terminal devices, which can be AP (Access Point), indoor antennas, cameras, and PC (Personal Computer) terminals. In an embodiment of this application, the conductive pin 31 is electrically connected to the electrical socket 43: the electrical energy received by the cable 32 is transmitted to the electrical socket 43 through the conductive pin 31, and the optical module transmits the electrical energy to the terminal device for operation thereof: the optical fiber 23 in the plug core 22 of the light guide assembly 2 is optically coupled with the optical socket 42 to establish a channel for transmitting optical signals. The electrical signals sent by the terminal device are transmitted to the optical module, by which they are converted into the electrical signals into optical signals. The optical signals enter the optical fiber 23 through the optical socket 42 to achieve transmission, and the processes of corresponding optical signal reception, conversion, and transmission are thus completed.

A possible embodiment is provided, as shown in FIGS. 1 to 11, wherein the housing assembly 1 comprises an outer housing 12, a rear sleeve 13, and a tail sleeve 14. The outer housing 12 comprises a housing body 122 having a first through hole 121. The rear sleeve 13 is a sleeve having a second through hole 131. The tail sleeve 14 is a sleeve having a third through hole 141.

The outer housing 12 is nested with the rear sleeve 13 to form a front-to-rear through accommodating space 11: that is to say, the housing body 122 is nested with the rear sleeve 13, and the first through hole 121 and the second through hole 131 are nested to form the accommodating space 11 for conveniently accommodating light guide assembly 2. The tail sleeve 14 is nested at one end of the rear sleeve 13 distant from the outer housing 12.

The optical fiber 23 passes through the third through hole 141 and enters the accommodating space 11. The plastic outer layer of the optical fiber 23 is removed, and then the optical fiber 23 is sequentially inserted into the tail handle 21 and the plug core 22 until the fiber core is flush with the end of the plug core 22 distant from the tail handle 21.

It can be understood that the design of the structure is diverse, so not all components of the light guide assembly 2 may be in the accommodating space 11. It is only necessary to fix the tail handle 21 in the accommodating space 11, such that for example, corresponding positioning grooves and blocks can be arranged in the housing body 122 and the rear sleeve 13 to cooperate with the tail handle 21 to achieve axial limit, so that the tail handle 21 is arranged in the accommodating space 11: and the other components can be directly or indirectly fixed to the tail handle 21.

The end of the plug core 22 that is distant from the tail handle 21 protrudes into the accommodating space 11, and the plug core 22 protrudes from the end of the housing body 122 that is distant from the rear sleeve 13, to facilitate the end of the plug core 22 distant from the tail handle 21 to be inserted into the corresponding component.

The components here refer to the optical socket of the optical module and the sleeve 53 of the photoelectric hybrid adapter (mentioned below).

Taking the sleeve 53 as the component as an example, the plug core 22 of the light guide assembly 2 of two photoelectric hybrid connectors 9 can be inserted from both sides of the sleeve 53 to achieve optical coupling and docking. The sleeve 53 can provide functions such as sealing, protection and guidance.

One possible embodiment, as shown in FIGS. 1 to 5, is that the conductive pin 31 is arranged on the tail handle 21 to achieve fixation, and the cable 32 passes through the tail handle 21 and is connected to the conductive pin 31 to form an electrical transmission channel to achieve electrical transmission.

A possible embodiment, as shown in FIGS. 1 to 5, the tail handle 21 comprises a handle body 211 and a radially convex protrusion 212 along the handle body 211. The handle body 211 can be a plastic or ceramic component, and the protrusion 212 can be an insulated plastic component. The protrusion 212 is provided with a first through hole 2121 along the axial direction of the handle body 211, and one end of the conductive pin 31 is inserted into the first through hole 2121, to achieve the fixation of conductive pin 31. The cable 32 can protrude into the first through hole 2121 and be connected to the conductive pin 31, achieving electrical insulation and avoiding electrical leakage. The protrusion 212 and the handle body 211 can be processed as a whole, with good connection strength: however, they can also be made separately and fixed then by bonding, clamping, or welding.

One possible embodiment is provided, as shown in FIGS. 1 to 5, wherein a relief groove 111 is provided on the wall surface of the accommodating space 11 to avoid colliding with conductive pins 31. Specifically, the relief groove 111 can be formed by the inner concave of the outer housing 12 or by the perforation of the rear sleeve 13, as long as it can prevent interference with the conductive pin 31.

One possible embodiment, as shown in FIGS. 1 to 5, is that the side wall of the housing body 122 is provided with a first channel 1221 connecting the external environment and the first through hole 121. The side wall of the tail sleeve 14 is provided with a second channel 142 connecting the external environment and the third through hole 141.

One end of cable 32 passes through the third through hole 141 from the side of the tail sleeve 14 distant from the rear sleeve 13, then reaches the outer side of the tail sleeve 14 through the second channel 142, and then it enters the accommodating space 11 through the first channel 1221 and is connected to the conductive pin 31, so as to ensure that the cable 32 is connected to the conductive pin 31 to form an electrical transmission channel to achieve electrical transmission, and that the external structure of the photoelectric hybrid connector remains unchanged for being applicable to universal market products.

In order to simplify the structure, the cable 32 and optical fiber 23 can be combined into one strand when passing through the third through hole 141. When the cable 32 passes through the second channel 142, the cable 32 and optical fiber 23 are separated into two strands, wherein the cable 32 is arranged according to the above route, and the optical fiber 23 passes through the tail handle 21 and the core component in sequence.

One possible embodiment is that both the first channel 1221 and the second channel 142 can be a through hole. The diameter of the through hole should be slightly larger than the diameter of the cable 32 to facilitate the cable 32 running therethrough.

As shown in FIGS. 1 to 5, the first channel 1221 can also be an open groove, which extends to the edge of the side wall of the housing body 122 near the side of the rear housing 13 and is provided with an opening at the edge of the side wall. That is to say, the first channel 1221 penetrates the edge of the side wall of the housing body 122 near the side of the rear housing 13, so that the first channel 1221 has a long U-shaped opening, which facilitates cable 32 to pass through the first channel 1221.

Similarly, the second channel 142 can also be an open groove which extends to the edge of the side wall of the tail sleeve 14 near the side of the rear housing 13 and is provided with an opening at the edge of the side wall. That is to say, the second channel 142 penetrates the edge of the side wall of the tail sleeve 14 near the side of the rear housing 13, causing the second channel 142 to have a long U-shaped opening, which facilitates the cable 32 to pass through the second channel 142.

A possible embodiment is provided, as shown in FIGS. 6 to 11, wherein the conductive pin 31 is arranged on the outer side of the housing assembly 1. Specifically, the conductive pin 31 can be arranged on one of the outer housing 12, the rear sleeve 13, or the tail sleeve 14, which could depend on the particular design, as long as it can ensure that the conductive pin 31 is relatively fixed with the housing assembly 1. In this embodiment, the conductive pin 31 can be arranged on the outer side of the outer housing 12.

A possible embodiment is provided, as shown in FIGS. 6 to 11, wherein the conductive pin 31 is arranged on the outer side surface of the housing body 122. The side wall of the tail sleeve 14 is provided with a second channel 142 connecting the external environment with the third through hole 141:

One end of the cable 32 passes through the third through hole 141 from the side of the tail sleeve 14 distant from the rear sleeve 13, and then passes through the second channel 142 to the outer side of the tail sleeve 14 to connect with the conductive pin 31, so as to ensure that the cable 32 is connected to the conductive pin 31 to form an electrical transmission channel to achieve electrical transmission, and that the external structure of the photoelectric hybrid connector remains unchanged for being applicable to universal market products.

Similarly, in order to simplify the structure, the cable 32 and optical fiber 23 can be combined into one strand when passing through the third through hole 141. When the cable 32 passes through the second channel 142, the cable 32 and optical fiber 23 are separated into two strands. The cable 32 is arranged according to the above route, while the optical fiber 23 passes through the tail handle 21 and the plug core assembly in sequence.

Figure 6:
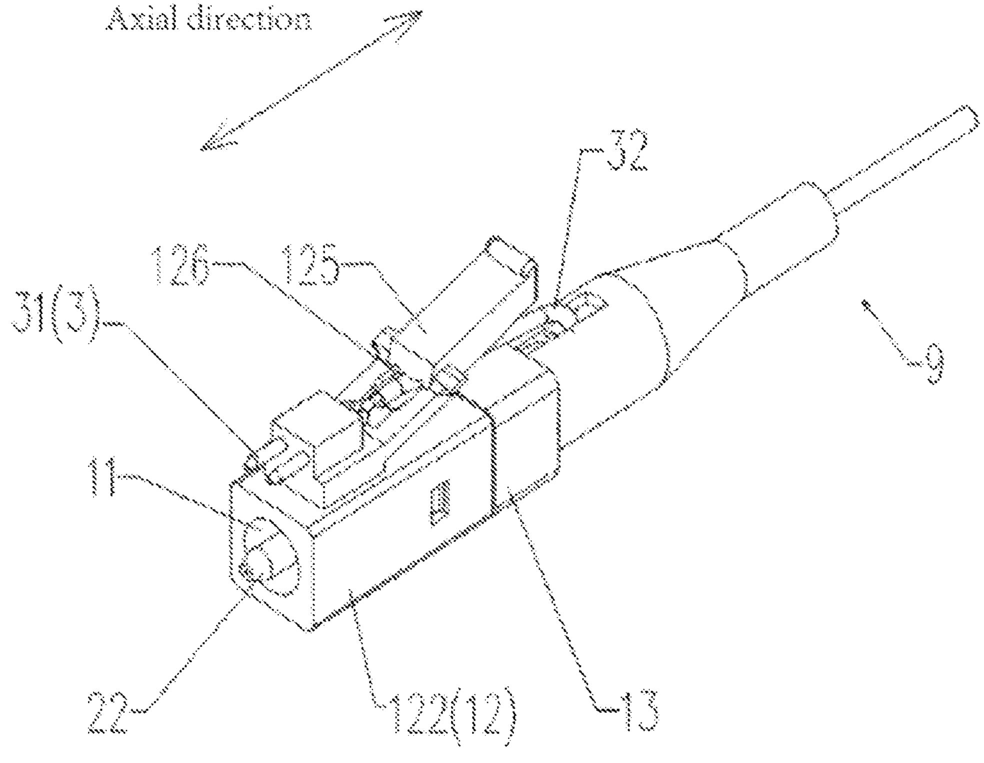
FIG. 6 is a three-dimensional view of a photoelectric hybrid connector according to another embodiment of the present application.
Figure 7:
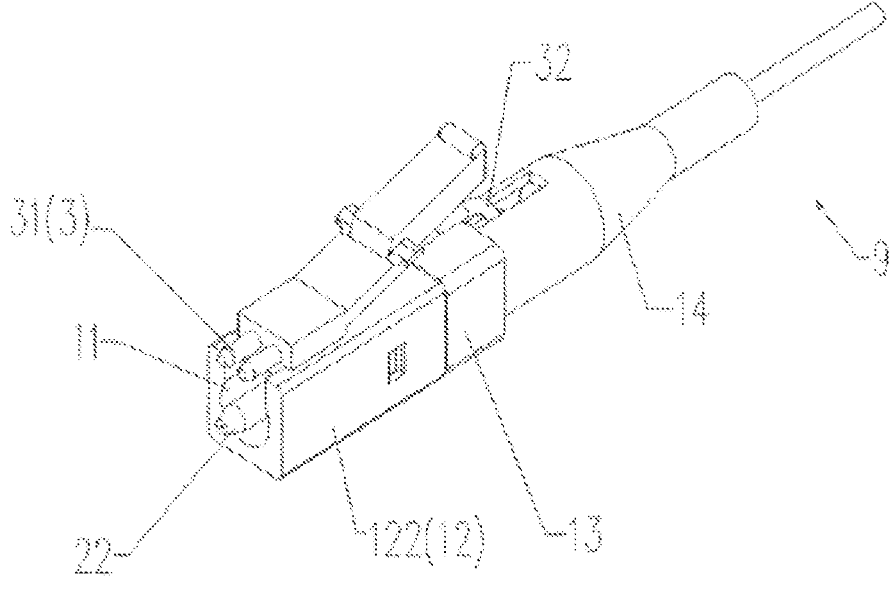
FIG. 7 is a three-dimensional view of a photoelectric hybrid connector according to another embodiment of the present application.
Figure 8:
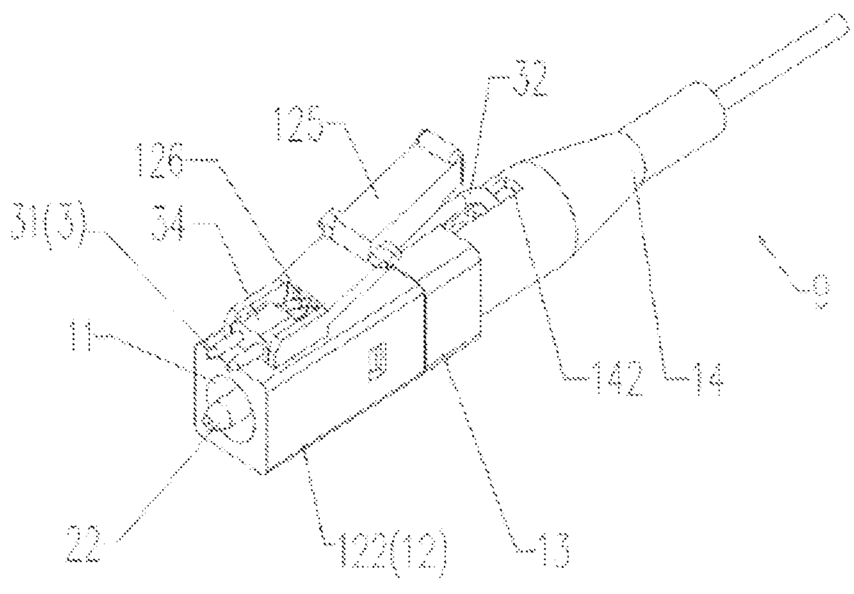
FIG. 8 is a three-dimensional view of a photoelectric hybrid connector in another embodiment of the present application.
Figure 9:
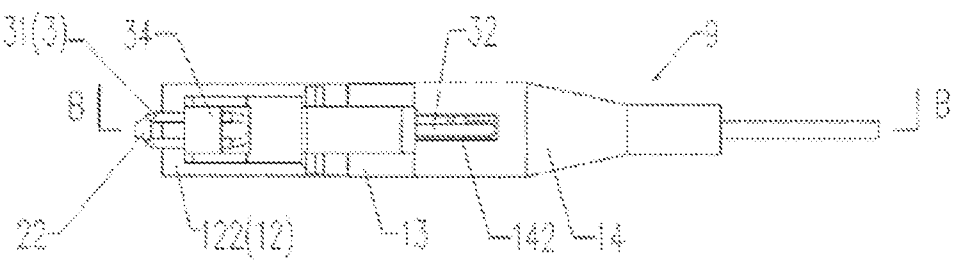
FIG. 9 is a top view of FIG. 8.
Figure 10:
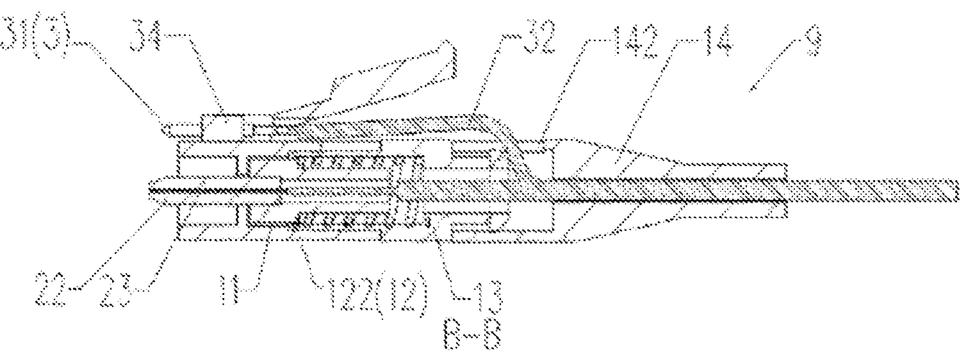
FIG. 10 is a B-B cross-sectional view of FIG. 9.
Figure 11:
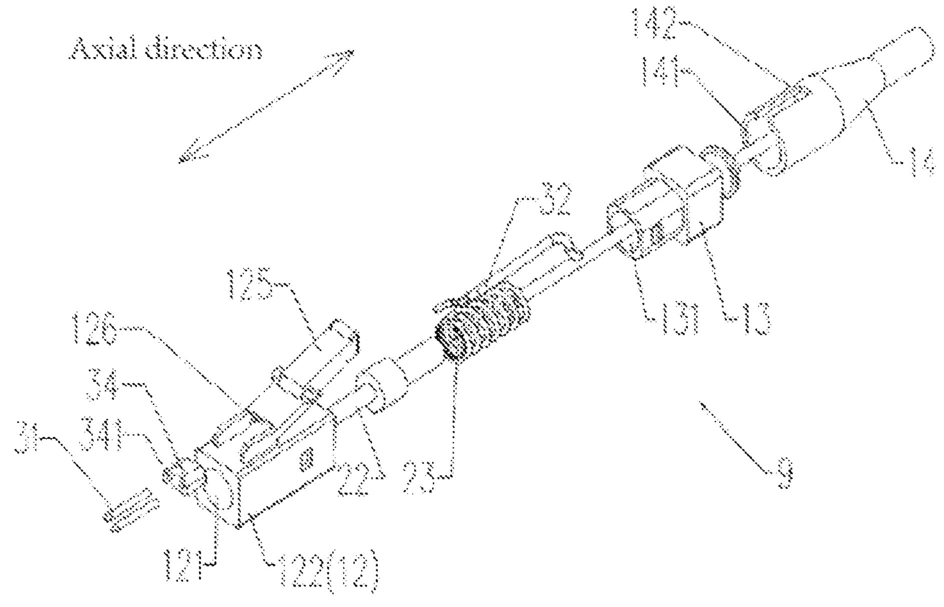
FIG. 11 is an exploded view of the photoelectric hybrid connector in FIG. 8 from a viewing angle.

As shown in FIGS. 6 and 7, the conductive pin 31 can be directly inserted into the side wall of the housing body 122, with a simple structure and good strength at the connection point. However, this requires high requirements for the size, insulation performance, and hardness of the housing body 122.

A possible embodiment is provided, as shown in FIGS. 8 to 11, wherein the conductive assembly 3 comprises a fixed seat 34 arranged on the side wall of the housing body 122. Among them, the housing body 122 can be an injection molded part, and the fixed seat 34 can be an insulated plastic or rubber part: the fixed seat 34 is provided with a second through hole 341 along the axial direction, and one end of the conductive pin 31 is inserted into the second through hole 341, to achieve the fixation of conductive pin 31. The cable 32 can extend into the second through hole 341 and be connected to the conductive pin 31, thereby achieving electrical insulation and avoiding electrical leakage. The fixed seat 34 and the housing body 122 can be made separately, and then fixed together by bonding, clamping, or welding, by which process difficulty and cost are reduced.

A possible embodiment is provided, as shown in FIGS. 1 to 11, wherein the outer housing 12 comprises an elastic buckle plate 125 arranged on the side wall of the housing body 122, and a component matched with the photoelectric hybrid connector can be provided with corresponding axial limit holes (not shown) to limit the axial movement of the housing assembly 1. The components here can be an optical module or a photoelectric hybrid adapter.

The elastic buckle plate 125 is provided with a third channel 126 for cable 32 to pass through, to avoid interference between the elastic buckle plate 125 and cable 32. The third channel 126 can be a through-hole, and the diameter of the through-hole should be slightly larger than the diameter of cable 32 to facilitate the installation of cable 32 being put therein.

A possible embodiment is provided, as shown in FIGS. 1 to 11, wherein the housing assembly 1 comprises an elastic member 15, which can be a spring. The elastic member 15 is arranged in the accommodating space 11, with one end of the elastic member 15 abutting against the rear sleeve 13 and the other end abutting against the tail handle 21. The elastic member 15 provides an acting force to the plug core 22 through the tail handle 21. When the plug cores 22 of the conductive assemblies 3 of the two photoelectric connectors 9 are respectively inserted from both sides of the sleeve member 53, both the length and the volume of the elastic member 15 can be changed to prevent hard contact therebetween, and further, in combination with being relying on the force of the elastic member 15, the two plug cores 22 are tightly connected, completing the optical coupling and docking. Similarly, the plug core 22 of the conductive assembly 3 of the photoelectric connector 9 is assembled with the optical socket 42 of the optical module (mentioned below), and the force of elastic part 15 is utilized to make the two parts abut closely, thus completing the optical coupling docking.

The present application further provides an optical module, which cooperates with the photoelectric hybrid connector 9 of the above embodiments, and as shown in FIGS. 1 to 12, the optical module comprises an electrical board 41, an optical socket 42, and an electrical socket 43.

The optical socket 42 and the electrical socket 43 are arranged at the same end of the electrical board 41, so that the conductive pin 31 and the plug core 22 of the photoelectric hybrid connector 9 are inserted at the same end of the optical module, thereby avoiding two insertion operations at the two ends of the optical module respectively, thereby simplifying the insertion operation, and avoiding the unsmooth photoelectric channel caused by insertion errors.

The optical socket 42 is connected to the core plug 22 of the photoelectric hybrid connector 9, and these two are optically coupled to establish a channel for transmitting optical signals. The electrical socket 43 is connected to the corresponding conductive pin 31, and the two are electrically connected. Those skilled in the art should know that electrical components essential for completing the functions of the optical module are arranged on the electrical board 41, which will not be described here again.

Taking the electrical socket 43 for transmitting electrical signals as an example, the optical signal sent from outside enters the optical socket 42 of the optical module through the optical fiber 23 in the plug core 22, the optical module processes the optical signal and converts it into an electrical signal, which is then transmitted to the terminal device through the electrical socket 43. It is also possible to implement the process in reverse: namely, the electrical signal sent by the terminal device is transmitted to the electrical socket 43 of the optical module through the conductive pin 31, and the optical module processes the electrical signal and converts it into an optical signal, which is then transmitted to the optical fiber 23 in the plug core 22 of the light guide assembly 2 through the optical socket 42, and then is transmitted to the outside. Therefore, the processes of receiving, converting, and transmitting optical and electrical signals are completed.

Taking the electrical socket 43 for supplying electrical energy to terminal devices as an example, the conductive pin 31 is electrically connected to the electrical socket 43; the electrical energy received by the cable 32 is transmitted to the electrical socket 43 through the conductive pin 31, and the optical module transmits the electrical energy to the terminal device for operation thereof: the optical fiber 23 in the plug core 22 of the light guide assembly 2 is optically coupled with the optical socket 42 to establish a channel for transmitting optical signals. The electrical signals sent by the terminal device are transmitted to the optical module, by which they are converted into optical signals. The optical signals enter the optical fiber 23 through the optical socket 42 to achieve transmission. Therefore, the processes such as reception, conversion, and transmission of the corresponding optical signal are completed.

Figure 12:
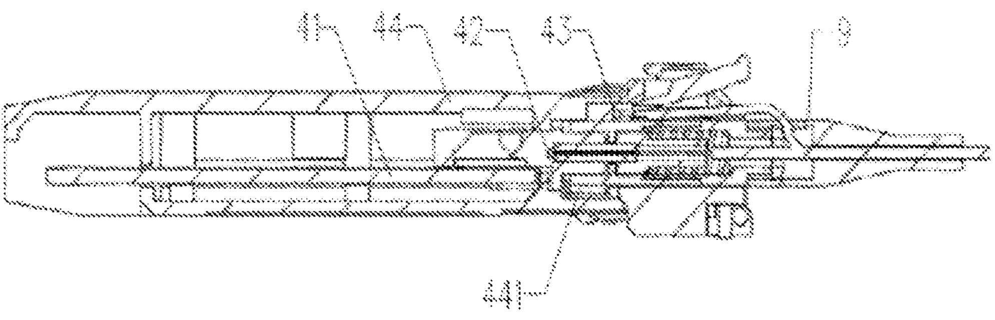
FIG. 12 is a schematic diagram of the assembly of the optical module and the photoelectric hybrid connector of an embodiment of the application.
Figure 13:
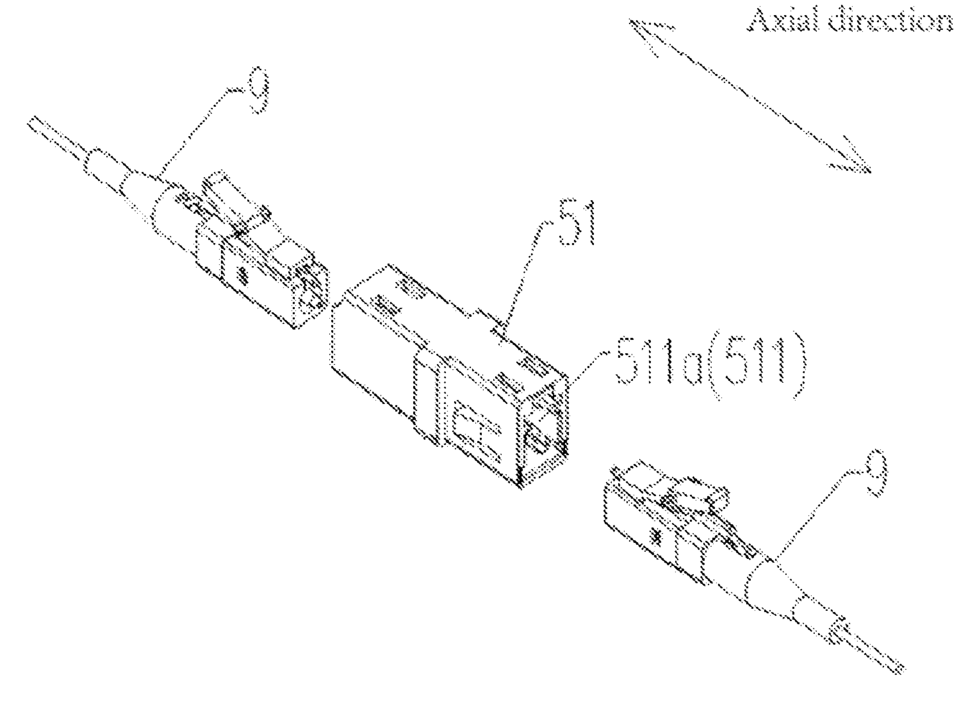
FIG. 13 is an exploded view of the photoelectric hybrid adapter and photoelectric hybrid connector in an embodiment of the present application.

A possible embodiment is provided, as shown in FIG. 12, wherein the optical module comprises a module housing 44, which can provide functions such as fixation, protection and dust prevention. The electrical board 41 is fixed inside the module housing 44, and an installation hole 441 is formed at the end of the module housing 44 to accommodate the optical socket 42 and the electrical socket 43. The installation hole 441 is configured to be connected to the housing assembly 1, and corresponding positioning grooves, positioning baffles, and other components can be arranged in the installation hole 441 to ensure that the housing assembly 1 is axially fixed and circumferentially fixed in the installation hole 441.

Further, a photoelectric hybrid adapter is provided herein, which is matched with the photoelectric hybrid connector 9 of any of the above embodiments, as shown in FIGS. 1 to 11, and FIGS. 13 to 19, the photoelectric hybrid adapter comprises a body 51, a support part 52, a sleeve member 53, and a conductive part 54.

At least one axial bottom-to-top through channel 511 is formed within the body 51. The support part 52 is supported within channel 511 and separates channel 511 into two sub-channels **511*a*, which are respectively inserted and matched with the corresponding housing assembly 1 of the photoelectric hybrid connector 9. The sleeve member 53 is hollow and arranged along the axial direction of the channel 511, and the sleeve member 53 is arranged on the support part 52 and connected to two sub-channels 511*a*. The two ends of the sleeve 53 are respectively connected and matched with the corresponding plug core 22 of the photoelectric hybrid connector 9; and the sleeve member 53 provides functions such as sealing, protection, and guidance. The plug cores 22 of two photoelectric hybrid connectors 9 are docked inside the sleeve 53, and the fiber 23 on the end face of the plug core 22** is optically coupled to establish a channel for transmitting optical signals.

The body 51 can be injection molded with plastic parts: the support part 52 can be integrally injection molded with the body 51 by plastic parts: and the sleeve part 53 can be a through channel formed on the support part 52, and these two are formed as a whole. In order to ensure docking accuracy, the sleeve member 53 is also made of ceramic separately and then embedded into the support part 52, which not only meets the accuracy requirements of use but also reduces costs.

The conductive part 54 is arranged on the support part 52, and is configured such that the conductive pins 31 of the two photoelectric hybrid connectors are electrically connected.

Figure 14:
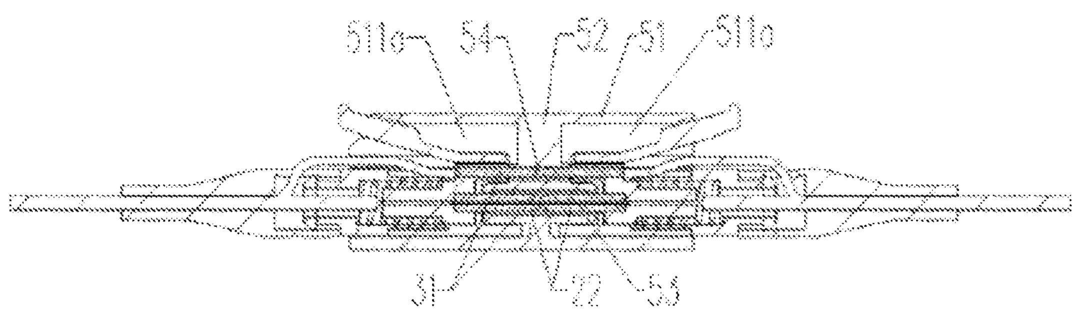
FIG. 14 is a schematic diagram of the assembly of the photoelectric hybrid adapter and photoelectric hybrid connector in FIG. 13.
Figure 15:
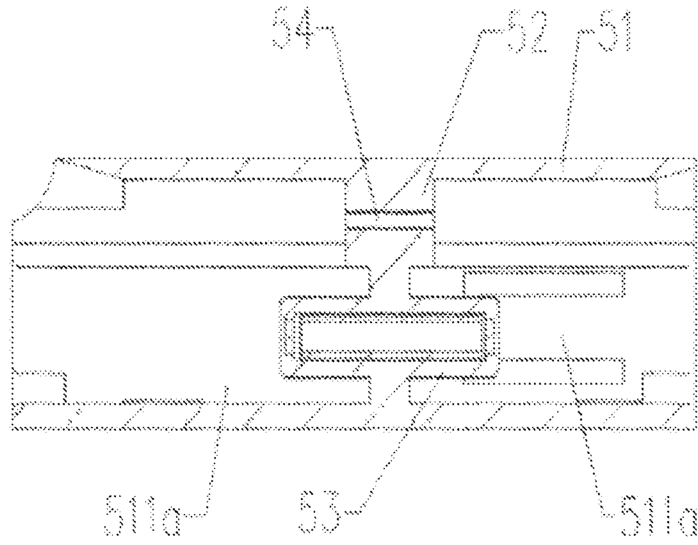
FIG. 15 is a schematic diagram of the structure of the photoelectric hybrid adapter in FIG. 13.
Figure 16:
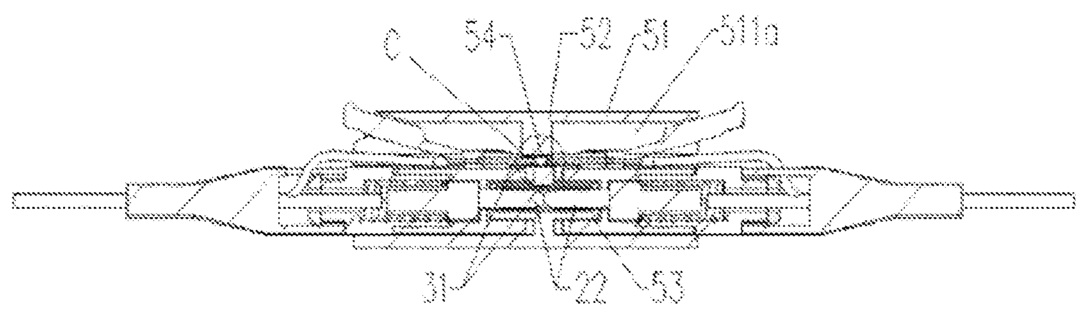
FIG. 16 is a schematic diagram of the assembly of a photoelectric hybrid adapter and photoelectric hybrid connector in an embodiment of the present application.
Figure 17:
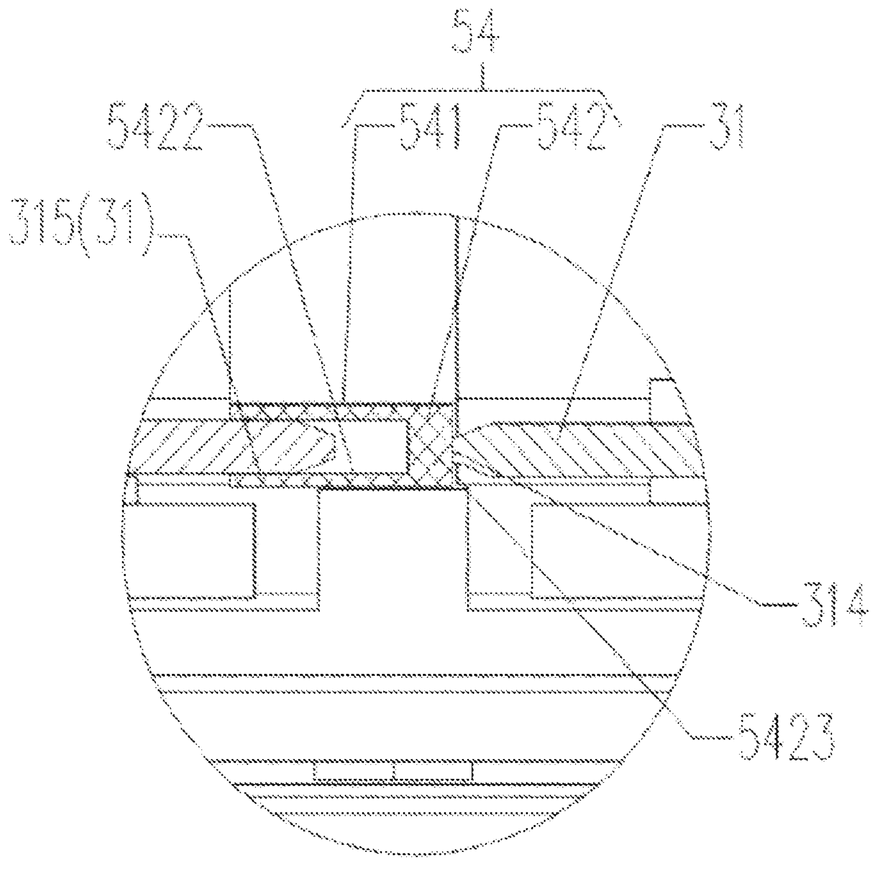
FIG. 17 is an embodiment of the locally enlarged view of C in FIG. 16.
Figure 18:
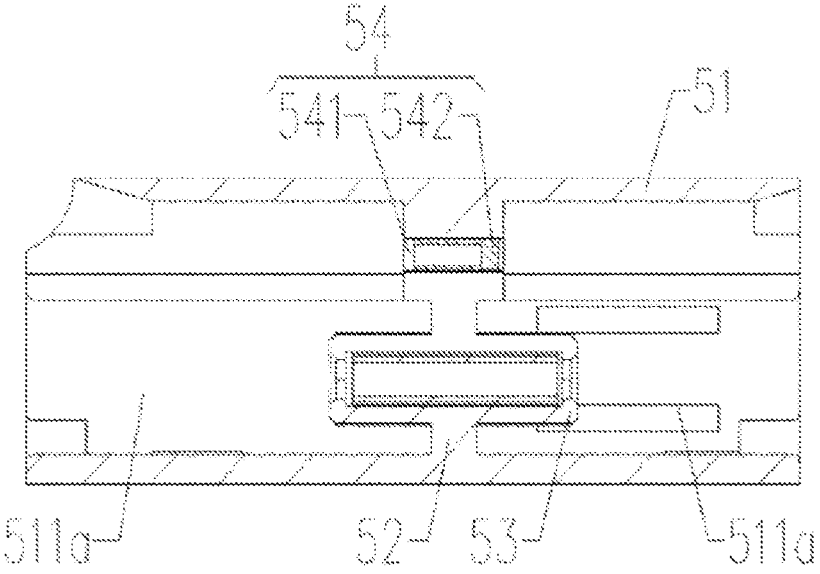
FIG. 18 is a schematic diagram of the structure of the photoelectric hybrid adapter in FIG. 16.

One possible embodiment, as shown in FIGS. 14 and 15, is that the conductive part 54 can be a cylinder made of conductive material, and the two ends of the conductive part 54 are configured to be electrically connected to the conductive pins 31 of the two photoelectric hybrid connectors, respectively, to achieve electrical connection between the conductive pins 31 of the two photoelectric hybrid connectors. At this time, the conductive part 54 plays a guiding and conducting role.

It can be understood that due to the conductivity of the conductive part 54 itself, the conductive pins 31 of the two photoelectric hybrid connectors do not need to be in contact. Therefore, by designing the lengths of the conductive pins 31 and the conductive part 54, the conductive pins 31 will not have hard contact even when inserted to the bottom. At this time, the conductive pins 31 can be a single metal rod.

One possible embodiment, as shown in FIGS. 14 and 15, is that the conductive part 54 is an axial through hole made of insulating material: for example, the conductive part 54, the support part 52, and the body 51 are all plastic and integrally formed. The two ends of the conductive part 54 are configured to provide for the insertion of conductive pins 31 of two photoelectric hybrid connectors to achieve abutting and thus the electrical connection.

A possible embodiment is provided, as shown in FIGS. 16 to 19, and FIG. 21, wherein the conductive part 54 comprises an axial through guide hole 541 and a conductive body 542 arranged in the guide hole 541. Both sides of the conductive body 542 are electrically connected to the conductive pins 31 of two photoelectric hybrid connectors. The conductive body 542 is a metal conductor made of materials with good conductivity such as brass and aluminum, to facilitate electrical connections.

Figure 19:
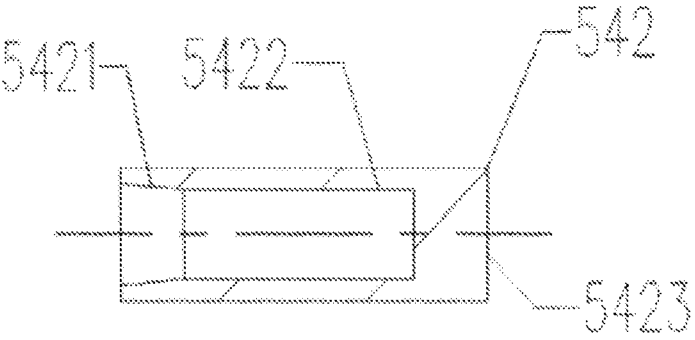
FIG. 19 is a schematic structural diagram of the conductive body in an embodiment of the present application.

As shown in FIG. 19, the conductive body 542 can be a sleeve with an open end, and the conductive contact pin 31 can be a single metal rod. By designing the depth of the sleeve and the length of the conductive contact pin 31, the closed end of the conductive body 542 abuts against the conductive pin 31 of one photoelectric hybrid connector, while the open end of the conductive body 542 is connected to the conductive pin 31 of another photoelectric hybrid connector 9 in a hole-axis insertion manner, to adjust the length fit and avoid hard contact.

Specifically, at one end of the opening of the conductive body 542, a bell mouth 5421 for guiding can be provided at the port to prevent the conductive pin 31 from being misaligned; and the inner wall 5422 of the conductive body 542 is tightly attached to the side 315 of the conductive pin 31. At the closed end of the conductive body 542, the tip plane 314 of the conductive contact pin 31 abuts against the bottom surface 5423 of the cylinder of the conductive body 542, thereby achieving effective connection of the conductive pins 31 of the two photoelectric hybrid connectors 9.

Figure 21:
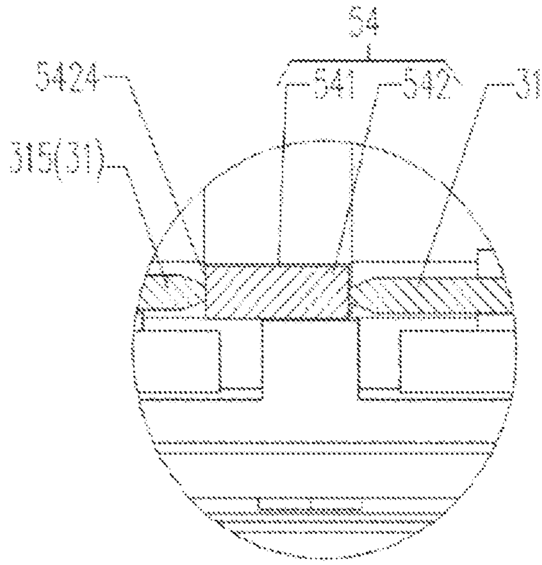
FIG. 21 is another embodiment of the locally enlarged view of C in FIG. 16.

As shown in FIG. 21, the conductive body 542 can also be a metal conductive cylinder with two end faces 5424. The two end faces 5424 of the conductive body 542 respectively abut against the conductive pins 31 of each photoelectric hybrid connector, thereby achieving electrical connection between the conductive pins 31 of the two photoelectric hybrid connectors.

Figure 20:
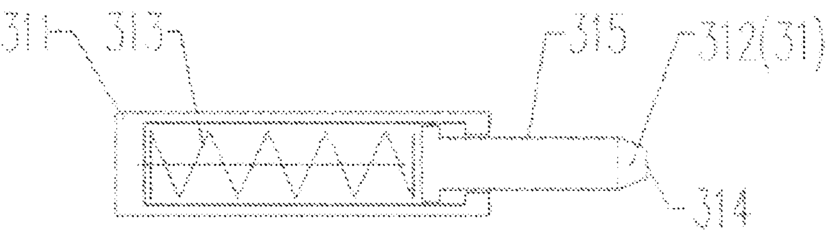
FIG. 20 is a schematic structural diagram of the conductive pin in an embodiment of the present application.

In order to avoid damage caused by hard contact between two conductive pins 31, in the above embodiments, they can be set as retractable components in case the conductive pins 31 abut, and as shown in FIG. 20, the conductive pin 31 comprises a needle tube 311, a needle head 312 inserted in the needle tube 311, and an elastic member 313 arranged in the needle tube 311. The needle tube 311 can be fixed on the tail handle 21, the outer housing 12, the rear housing 13, or the tail sleeve 14. The conductive pin 31 is configured in a manner that the end face of the needle head 312 is retractable relative to the housing assembly 1 to avoid hard contact during assembly. The cross-section of the needle head 312 is a circle, or a polygonal long column, and the material thereof can be copper, steel, aluminum, etc. which have a good conductivity.

The various embodiments/embodiments provided in this application can be combined with each other as long as no conflict occurs.

The above is only a preferred embodiment of the present application and is not intended to limit it. For those skilled in the art, there may be various modifications and variations to the present application. Any modifications, equivalent replacements, improvements, etc. made within the spirit and principles of this application shall be included within the scope of protection of this application.

What is claimed is:

1. A photoelectric hybrid connector, wherein the photoelectric hybrid connector comprises:

a housing assembly, comprising a front-to-rear through accommodating space;

a light guide assembly comprising a tail handle, a plug core, and an optical fiber, wherein the plug core is arranged on one end of the tail handle; the tail handle is arranged in the accommodating space; and the optical fiber is sequentially inserted into the tail handle and the plug core; and a conductive assembly, comprising at least one conductive pin and a cable connected to the conductive pin;

wherein the conductive pin and the plug core are located on a same side of the accommodating space, and wherein the conductive pin is arranged on an outer side of the housing assembly, wherein the housing assembly comprises an outer housing, a rear sleeve, and a tail sleeve, wherein the outer housing is nested with the rear sleeve to form the front-to-back through accommodating space, and the tail sleeve is nested at one end of the rear sleeve far away from the outer housing; and the conductive pin is arranged on an outer side of the outer housing.

2. The photoelectric hybrid connector according to claim 1, wherein the outer housing comprises a housing body with a first through hole, and the conductive pin is arranged on an outer side surface of the housing body;

the rear sleeve is a sleeve with a second through hole; the housing body is nested with the rear sleeve, and the first through hole is connected with the second through hole to form the accommodating space;

the tail sleeve is a sleeve with a third through hole, and a side wall of the tail sleeve is provided with a second channel; and one end of the cable passes through the third through hole from a side of the tail sleeve distant from the rear sleeve, and then passes through the second channel to reach an outer side of the tail sleeve to connect with the conductive pin.

3. The photoelectric hybrid connector according to claim 2, wherein the conductive assembly comprises a fixed seat arranged on a side wall of the housing body, the fixed seat is provided with a second through hole, and one end of the conductive pin is inserted into the second through hole.

4. The photoelectric hybrid connector according to claim 3, wherein the outer housing comprises an elastic buckle plate arranged on the side wall of the housing body, and the elastic buckle plate is provided with a third channel for the cable to pass through.

5. The photoelectric hybrid connector according to claim 1, wherein the housing assembly comprises an elastic member, which is arranged in the accommodating space, one end of the elastic member abuts against the rear sleeve, and the other end abuts against the tail handle.

6. A photoelectric hybrid connector, wherein the photoelectric hybrid connector comprises:

a housing assembly, comprising a front-to-rear through accommodating space;

a light guide assembly comprising a tail handle, a plug core, and an optical fiber, wherein the plug core is arranged on one end of the tail handle; the tail handle is arranged in the accommodating space; and the optical fiber is sequentially inserted into the tail handle and the plug core; and a conductive assembly, comprising at least one conductive pin and a cable connected to the conductive pin;

wherein the conductive pin and the plug core are located on a same side of the accommodating space, and wherein the conductive pin comprises a needle tube, a needle head inserted in the needle tube, and an elastic member arranged within the needle tube, wherein the conductive pin is configured so that an end face of the needle head is retractable relative to the housing assembly.

7. A photoelectric hybrid adapter, matched with a photoelectric hybrid connector, wherein the photoelectric hybrid connector comprises:

a housing assembly, comprising a front-to-rear through accommodating space;

a light guide assembly comprising a tail handle, a plug core, and an optical fiber, wherein the plug core is arranged on one end of the tail handle; the tail handle is arranged in the accommodating space; and the optical fiber is sequentially inserted into the tail handle and the plug core; and a conductive assembly, comprising at least one conductive pin and a cable connected to the conductive pin;

wherein the conductive pin and the plug core are located on a same side of the accommodating space, and wherein the photoelectric hybrid adapter comprises a body, a support part, a sleeve member, and a conductive part;

wherein at least one axial through channel is formed within the body;

the support part is supported within the channel and separates the channel into two sub-channels, which respectively plug fit the corresponding housing assembly of the photoelectric hybrid connector;

the sleeve member is hollow and arranged along an axial direction of the channel, the sleeve member is arranged on the support part and connected to the two sub-channels, two ends of the sleeve member respectively plug fit with the corresponding plug core of the photoelectric hybrid connector;

the conductive part is arranged on the support part, and is configured such that the conductive pins of two photoelectric hybrid connectors are electrically connected.

8. The photoelectric hybrid adapter according to claim 7, wherein the conductive part is an axial through hole, and the two ends of the conductive part are configured to provide for insertion of the conductive pins of two photoelectric hybrid connectors to enable them to abut, so as to achieve electrical connection.

9. The photoelectric hybrid adapter according to claim 7, wherein the conductive part comprises an axially through guide hole and a conductive body arranged in the guide hole, and both sides of the conductive body are electrically connected to the conductive pins of two photoelectric hybrid connectors respectively.

10. The photoelectric hybrid adapter according to claim 9, wherein the conductive body is a sleeve with an open end, into which the conductive pin of one photoelectric hybrid connector is inserted, and a closed end of which abuts against the conductive pin of another photoelectric hybrid connector.

11. The photoelectric hybrid adapter according to claim 9, wherein two end faces of the conductive body abut against the conductive pins of each photoelectric hybrid connector respectively.

12. A photoelectric hybrid connector, wherein the photoelectric hybrid connector comprises:

a housing assembly, comprising a front-to-rear through accommodating space;

a light guide assembly comprising a tail handle, a plug core, and an optical fiber, wherein the plug core is arranged on one end of the tail handle; the tail handle is arranged in the accommodating space; and the optical fiber is sequentially inserted into the tail handle and the plug core; and a conductive assembly, comprising at least one conductive pin and a cable connected to the conductive pin;

wherein the conductive pin and the plug core are located on a same side of the accommodating space;

wherein the conductive pin extends at least partially out of the accommodating space; and wherein the conductive pin comprises a needle tube, a needle head inserted in the needle tube, and an elastic member arranged within the needle tube, wherein the conductive pin is configured so that an end face of the needle head is retractable relative to the housing assembly.

* * * * *